United States Patent [19]

O'Boyle et al.

[11] Patent Number: 5,640,242
[45] Date of Patent: Jun. 17, 1997

[54] ASSEMBLY AND METHOD FOR MAKING IN PROCESS THIN FILM THICKNESS MEASURMENTS

[75] Inventors: Martin Patrick O'Boyle, Peekskill, N.Y.; John Charles Panner, Underhill, Vt.; Thomas Edwin Sandwick, Hopewell Junction, N.Y.; Theodore Gerard van Kessel, Millbrook, N.Y.; Hemantha Kumar Wickramasinghe, Chappaqua, N.Y.

[73] Assignee: International Business Machines Corporation, Armonk, N.Y.

[21] Appl. No.: 594,925

[22] Filed: Jan. 31, 1996

[51] Int. Cl.⁶ .................................................. G01B 11/06
[52] U.S. Cl. ............................................. 356/381; 356/357
[58] Field of Search ................................... 356/381, 357, 356/383, 382

[56] References Cited

U.S. PATENT DOCUMENTS

| | | |
|---|---|---|
| 5,333,049 | 7/1994 | Ledger . |
| 5,409,538 | 4/1995 | Nakayama et al. .................. 356/381 X |
| 5,413,941 | 5/1995 | Koos et al. . |
| 5,436,725 | 7/1995 | Ledger .................................. 356/381 X |
| 5,452,953 | 9/1995 | Ledger . |
| 5,486,701 | 1/1996 | Norton et al. ....................... 356/381 X |

*Primary Examiner*—Frank G. Font
*Assistant Examiner*—Reginald A. Ratliff
*Attorney, Agent, or Firm*—Whitham, Curtis, Whitham & McGinn; Stephen C. Kaufman

[57] ABSTRACT

An assembly for making thickness measurements in a thin film structure. The assembly comprises a chemical-mechanical planarization (CMP) subassembly for effecting topographical changes in a thin film structure; and, a measuring subassembly for detecting the thickness of a thin film structure, the measuring subassembly interposed with the CMP subassembly so that a thickness measurement can be made during and independent of CMP process operations.

10 Claims, 3 Drawing Sheets

ASSEMBLY AND METHOD FOR MAKING IN PROCESS THIN FILM THICKNESS MEASURMENTS

FIELD OF THE INVENTION

This invention relates to an assembly and method for making in process thin film thickness measurements.

BACKGROUND OF THE INVENTION

Our work comprises combining and integrating two disparate technologies, as they relate to semiconductor wafer processing and thin film structures. The two technologies comprise, on the one hand, semiconductor chemical-mechanical processes (CMP), and, on the other hand, techniques for measuring a thickness of a thin film structure as its surface topography evolves in response to a chemical-mechanical process. We now discuss these two technologies, in turn.

A chemical-mechanical process relates generally to the following situation. Semiconductor wafers increasingly subtend circuit miniaturization and increased density. Fabrication of such a wafer may create an outer wafer surface that has an undesirable high degree of variable topography. Accordingly, it is often necessary to polish such a wafer surface, in order to provide a requisite substantially planar surface.

One such process to this end comprises chemical-mechanical polishing. This process includes holding and rotating a thin, flat wafer of semiconductor material against a wetted polishing surface under controlled chemical, pressure, and temperature conditions. A chemical slurry containing a polishing agent, such as silica or alumina, may be used as an abrasive medium. Additionally, the chemical slurry may contain selected chemicals which can etch various surfaces of a wafer during processing. In sum, the polishing effect on the wafer can result in both a chemical and a mechanical action.

We now turn our attention to the second independent technology alluded to above, namely, techniques for measuring a thickness of a thin film structure. Important and representative such techniques are known. For a first example, we reference Koos et al. U.S. Pat. No. 5,413,941, which discusses certain techniques for in situ detection of chemical-mechanical planarization, including using laser interferomtery and intensity contrast, for determining CMP end point. For a second and a third example, we reference Ledger's work in U.S. Pat. Nos. 5,333,049 and 5,452,953, which disclose employment of full aperture irradiation of a wafer for detection by a camera to initialize a further micropolishing process.

SUMMARY OF THE INVENTION

Against this backdrop, we pose for ourselves a problem that is believed not to be defined by the prior art: articulate a method and construct an assembly for verifying film thickness during, but independent of, process operations. Such a method and assembly, we note, would have salient utility and advantage, since it is clear and imperative to us that CMP cycle times can be qualitatively improved by eliminating a need for "send ahead" wafer measurements, thus controlling the process.

We have now discovered a novel assembly and method that addresses and solves this problem, thereby realizing important advantages, including controlling the chemical-mechanical process.

In a first aspect, the present invention discloses a novel assembly for making a thickness measurement in a thin film structure. The assembly comprises:

1) a chemical-mechanical planarization (CMP) subassembly for effecting topographical changes in a thin film structure;

and 2) a measuring subassembly for detecting the thickness of a thin film structure, the measuring subassembly interposed with the CMP subassembly so that a thickness measurement can be made during and independent of CMP process operations.

In a second aspect, the present invention describes a novel method for measuring a thickness of a thin film structure, which method comprises the steps of:

1) providing an optical measuring assembly comprising:
   (i) a spectrally filtered light source for illuminating a thin film structure and generating a reflectively scattered beam therefrom;
   (ii) a detector system for detecting the reflectively scattered beam and providing an output signal corresponding thereto;

and (iii) means for comparing the output signal with a set of reference characteristics corresponding to known thicknesses for providing an output corresponding to a thickness of a thin film structure under a chemical-mechanical planarization (CMP) process;

and 2) employing the optical measuring assembly during but independent of a chemical-mechanical planarization (CMP) process for making thickness measurements in a thin film structure.

BRIEF DESCRIPTION OF THE DRAWINGS

The invention is illustrated in the accompanying drawing, in which.

and

Figure 1:
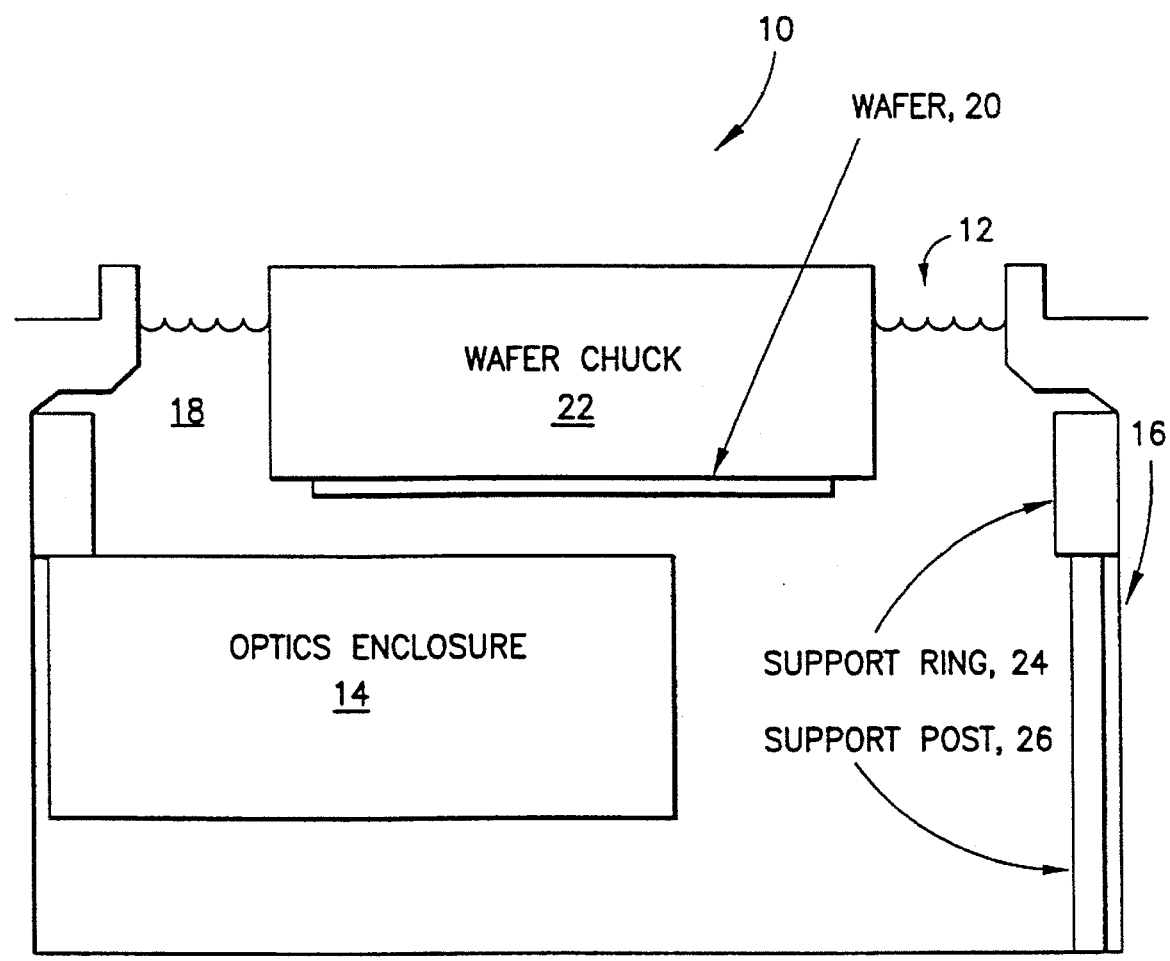
FIG. 1 shows a view of an in process film thickness measurement assembly in a CMP rinse tank.
Figure 3:
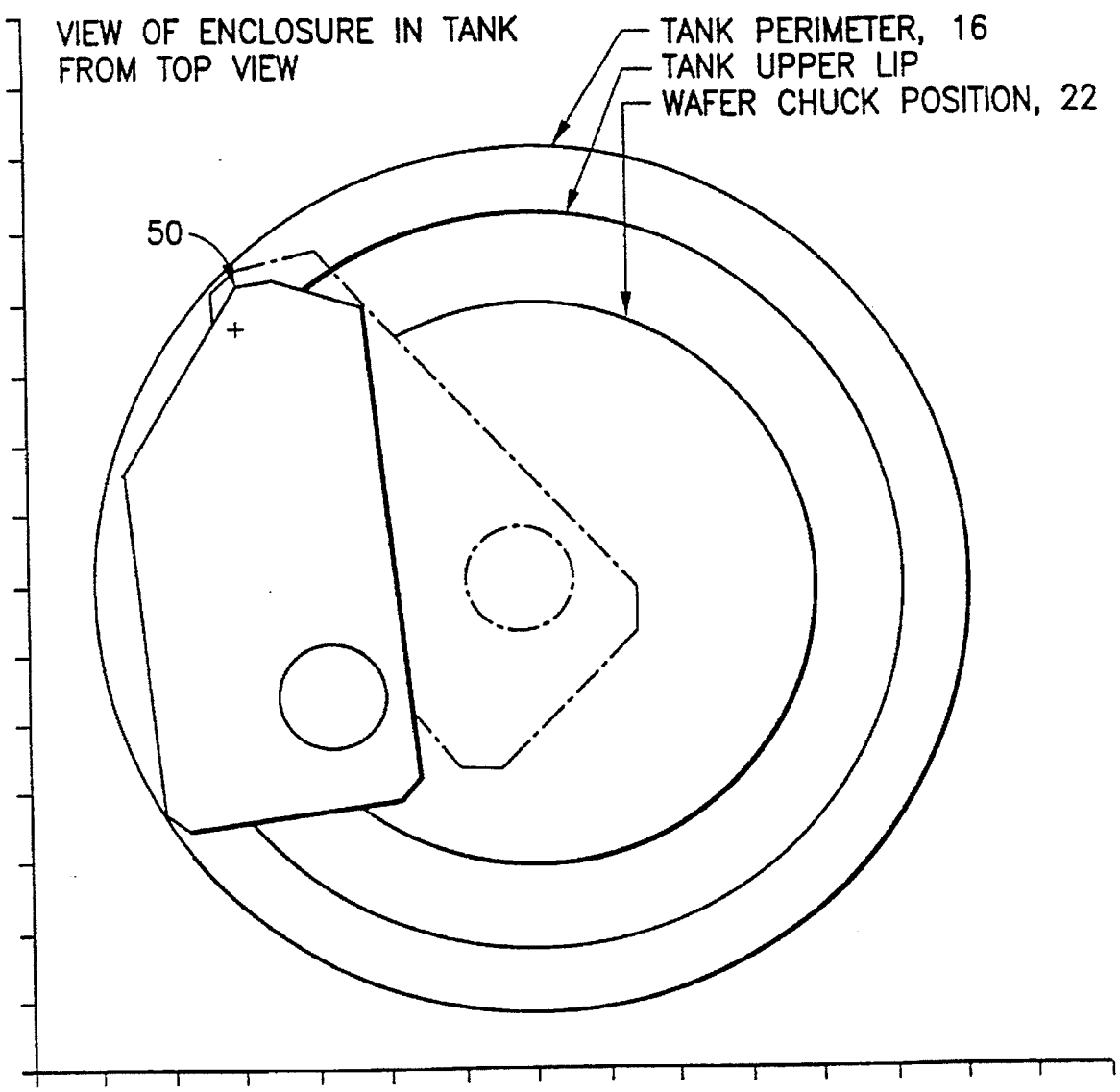

FIG. 3 shows a top view and advantageous features of the FIG. 1 assembly.

DETAILED DESCRIPTION OF THE INVENTION

Attention is now directed to FIG. 1, which shows a preferred assembly 10 suitable for measuring a thin film structure during a conventional chemical-mechanical polishing operation. In general, the assembly 10 includes a chemical-mechanical planarization (CMP) subassembly 12 for effecting topographical changes in a thin film structure; and, a measuring subassembly 14 for detecting the thickness of a thin film structure, the measuring subassembly 14 interposed with the CMP subassembly 12 so that a thickness measurement can be made during and independent of CMP process operations. We now set forth preferred aspects of each of these two subassemblies, as prelude to disclosing a preferred method of using the assembly 10.

The FIG. 1 CMP subassembly 12 preferably comprises a conventional rinse tank 16, preferably filled with water 18 in order to keep a semiconductor wafer 20 wet, and in order to provide a continuous optical medium free of slurry. The semiconductor wafer 20 is preferably positioned in the CMP subassembly 12 by a suction action developed with a conventional wafer chuck 22. A support ring 24 and a support post 26 comprise further preferred structural components of the CMP subassembly 12.

Figure 2:
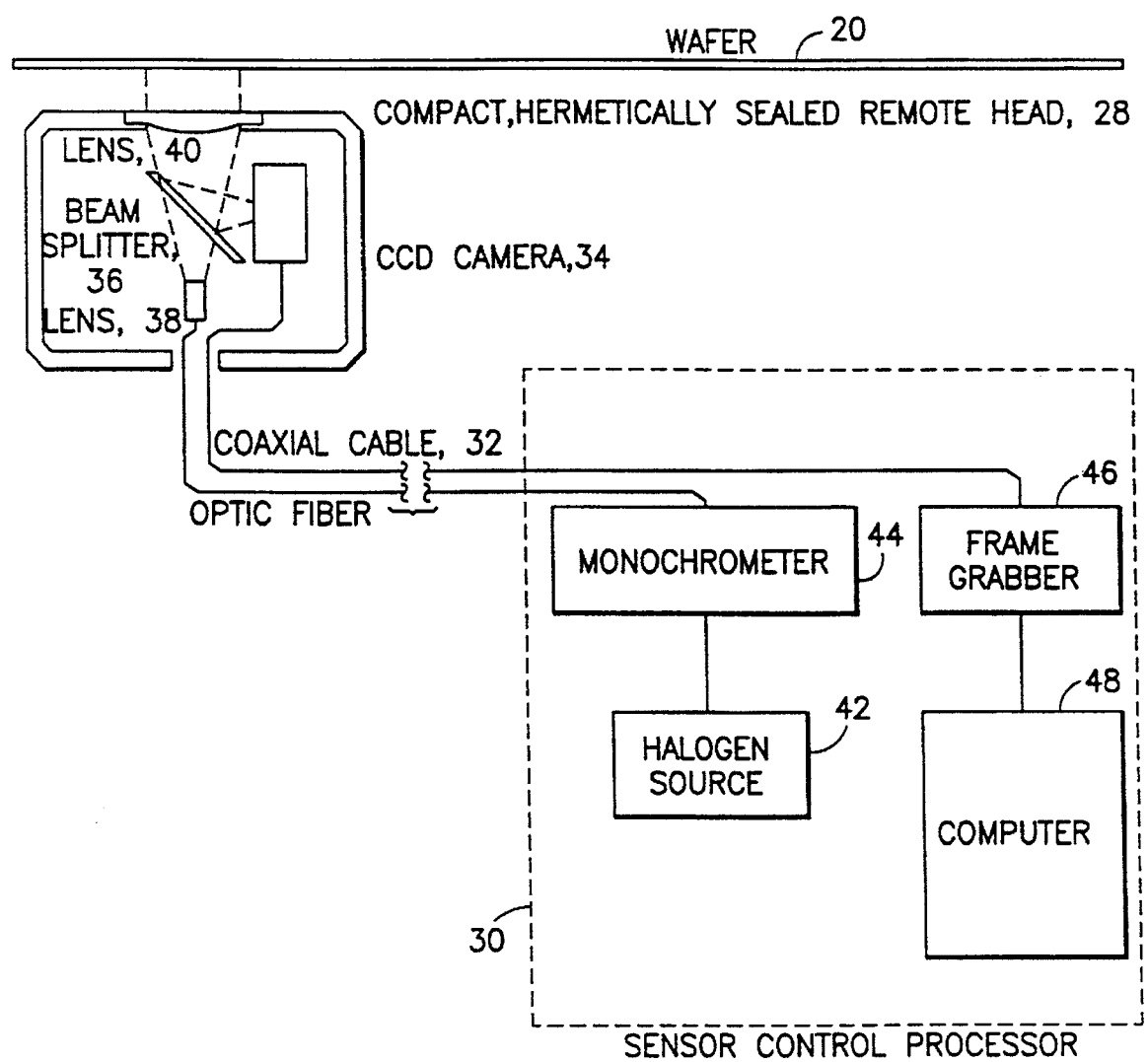
FIG. 2 provides details of a preferred embodiment of the FIG. 1 assembly.

Details of the FIG. 1 measuring subassembly 14 are presented in FIG. 2. In overview, the measuring subassembly 14 preferably comprises a compact, hermetically sealed remote optical head 28, preferably coupled to a sensor control processor 30 by way of a coaxial cable 32 comprising a coherent optic fiber light guide.

In particular, the optical head 28 preferably includes a conventional change coupled device (CCD) 34 connected to the coaxial cable 32, and capable of imaging the wafer 20, preferably by way of the beamsplitter 36, imaging lenses 38, 40 arrangement, as shown. A suitable CCD has a resolution on the order 512×512 pixels.

The sensor control processor 30 comprises conventional components including preferably a light source 42 e.g., tungsten halogen providing polychromatic white light, for projection through a monochrometor 44, the monochrometor 44 functioning to isolate a narrow range of wavelengths. The sensor control processor 30 also preferably includes a video frame grabber 46 connected to a computer 48. The computer 48 preferably comprises means for comparing a CCD output signal of an imaged wafer 20 with a set of reference characteristics corresponding to known thickness, for providing an output corresponding to a thickness of a thin film structure under a chemical-mechanical planarization process.

FIG. 3 shows a top view of the FIG. 1 assembly 10. Here, an important feature of the invention may be evinced in the form of a multiposition movable arm 50 which can support a sensor head 28: the movable arm 50 can advantageously enable measurements at multiple radial positions on the wafer 20.

A preferred assembly 10 suitable for measuring a thin film structure during a chemical-mechanical polishing operation has now been disclosed by way of FIGS. 1–3, and attention is now directed to preferred steps of the method of the present invention, summarized above, which preferably incorporate such an assembly 10.

First, by way of backdrop, consider that a typical extant chemical-mechanical polish process requires numerous send ahead operations, to be performed in order to achieve process stability. This is particularly true for oxide planarizations in the back of the line, which case typically requires one micron to be polished off a 2 micron thick oxide film over metal. We note that this blind spot in the middle of oxide is a demanding operation that usually requires frequent send ahead operations, to maintain process stability.

Now, send ahead measures are typically performed by partially polishing the wafer, then removing the wafer from the polishing tool, followed by brush cleaning the wafer, measuring the remaining oxide film thickness and a suitable tool (e.g., Tencor TF1), determining the polish rate using the film thickness data and the elapsed polish time for the wafer, projecting the remaining polish time, and returning the wafer to the polishing tool in order to complete the polish operation.

The present novel invention, in sharp contrast to the extant methodology, enables one to rapidly measure a film thickness on a wafer, while it remains chucked in the polish tool, or other applicable process equipment, thereby eliminating the time and materials cost of send ahead operations. To this end, we now disclose preferred steps of the present method.

In one approach, polychromatic while light from the source 42 may be projected through the monochrometer 44, to isolate a narrow range of wavelengths. The light so obtained is then transmitted to the wafer 20 surface via the optical fiber 32, where an optical element may be used preferably to collumate the light to near normal incidence at the wafer surface.

As indicated above, the region between the optics and the wafer surface is optionally filed with water to keep the wafer wet, and to provide a continuous optical medium free of slurry in the case of CMP.

At the wafer surface, the narrow band light is interfered with the films on the surface of the wafer, ad reflected back to the optical head 28 where it is imaged and coupled to a coherent fiber bundle, which transmits the light to the imaging detector (CCD camera or other). The camera detects the light and makes it possible to measure the light intensity variations at a given wavelength band due to interference at an arbitrary point in the image. The detected interference image preferably is digitized, and transmitted to the computer 48 for analysis and measurement.

Measurement of the interference signal at multiple wavelengths is made possible by incrementing the monochrometer setting, (under computer control). At each sampled video frame, the monochrometer may be adjusted to a new wavelength setting, thereby making it possible to scan a range of wavelengths frame at a time. The optical head of the device is small relative to the wafer, and images an area that is typically smaller that the total wafer surface. By restricting the image size to a partial area of the wafer, it is possible to achieve a compact design and a spot size corresponding to one pixel on the order of 50 microns. This is consistent with the needs of the process, and allows the use of commercially available video equipment (resolutions on the order of 512×512 pixels).

The area imaged preferably is on the order of 25×25 mm to include at least one chip site; imaging an entire chip site allows known pattern recognition techniques to select a specific target or product region for measurement at a spatial resolution consistent with process control needs. This also allows the physical size of the optical head to be small. Note, on the other hand, that selecting an area to be imaged that is significantly larger than a chip site can result in optics that are too large to be practical, and resolution that is too coarse to be of practical use.

The optical head may be placed in the rinse area (or other suitable location) of the CMP tool, to allow measurement of the wafer while the wafer remains on the polishing chuck. In other process equipment, the sensor can be placed in an appropriate location (such as the top viewing port of an AME 5000).

The compact design allows the head to be mounted in the CMP tool without extensive modification of the tool itself. Since it may be placed in the rinse area, it is possible to allow measurement of the wafer without undue interference with the CMP tool's normal operation.

The wafer orientation is unknown at the start of the measurement cycle. Pattern recognition on the image obtained from the CCD at a given wavelength allows the wafer orientation in terms of angle and offset to be determined using appropriate mathematics. Once the image position on the wafer is determined, a particular set of measurement sites is selected. The monochrometer is then scanned over a range of wavelengths (one wavelength setting per frame), and the pixel values corresponding to the target locations are stored in succession to create an interference spectrum. Using the known values of the optical index of the films, the spectrum at the target region and the instrument response indices function, a value for the desired film thickness is computed using suitable mathematics. The time required for this measurement is on the order of 2.0 seconds or less.

Since the film thickness measurement can be performed at any time during or after the polishing operation by simply moving the wafer to the rinse area, it is possible to measure the film thickness at an intermediate point during the polish operation to determine the rate of polish and extrapolate an accurate value for the remaining polish time to feed forward to the CMP polish tool, thus controlling the process. The measurement can be performed multiple times during the polish operation and/or at the end of the polish operation to verify polish performance. Finally, measurement at multiple radial positions on the wafer is possible by mounting the sensor head on a simple multiposition movable arm.

We claim:

1. An assembly for making in process thickness measurements in a thin film structure on a semiconductor wafer, the assembly comprising:

a chemical-mechanical polisher (CMP) subassembly for effecting topographical changes in a thin film structure on a semiconductor wafer, said CMP subassembly comprising a wafer chuck supporting the wafer within a rinse tank; and a measuring subassembly for detecting a thickness of the thin film structure on the semiconductor wafer while in the wafer chuck and within the rinse tank, the measuring subassembly making a thickness measurement during and independent of CMP process operations.

2. An assembly according to claim 1, wherein the measuring subassembly comprises:

a hermetically sealed remote head positioned adjacent a surface of the wafer having the thin film structure to be measured and comprising (i) means for illuminating a thin film structure and generating a reflectively scattered beam therefrom; and (ii) a detector system for detecting the reflectively scattered beam and providing an output signal corresponding thereto; and means separate from said hermetically sealed remote head and connected to said detector system to receive the output signal therefrom for comparing the output signal with a set of reference characteristics corresponding to known thicknesses to provide an output corresponding to a thickness of a thin film structure under CMP process.

3. An assembly according to claim 2, wherein the measuring subassembly further comprising:

a) a source of white light;

b) means in the hermetically sealed remote head for focusing the white light into a beam directed to the thin film structure; and c) means for passing only one selected wavelength of radiation at a time.

4. An assembly according to claim 2, wherein the detector system comprises a charge coupled device.

5. An assembly according to claim 2, further comprising a multipositon moveable arm on which is mounted the hermetically sealed remote head, said moveable arm being moveable to position the hermetically sealed remote head at multiple radial positions on the wafer.

6. A method for performing an in process thickness measurement of a thin film structure on a semiconductor wafer which method comprises the steps of:

supporting a semiconductor wafer in a wafer chuck within a rinse tank of a chemical-mechanical polisher (CMP);

illuminating a thin film structure and generating a reflectively scattered beam therefrom while the wafer is supported in the wafer chuck within the rinse tank;

detecting the reflectively scattered beam and providing an output signal corresponding thereto; and comparing the output signal with a set of reference characteristics corresponding to known thicknesses for providing an output corresponding to a thickness of a thin film structure under a CMP process whereby the in process thickness measurement is made during but independent of the CMP process.

7. A method according to claim 6, wherein the step of illuminating comprises illuminating at least one chip site of a thin film structure on the semiconductor wafer.

8. A method according to claim 7, comprising illuminating an area on the order of 25×25 mm.

9. An assembly according to claim 5, wherein the means for illuminating includes a lens system for imaging an area on the order of 25×25 mm to include at least one chip site on the wafer.

10. An assembly according to claim 9, further comprising:

means for positioning said moveable arm to a predefined radial position on the wafer; and pattern recognition means for selecting a specific region corresponding to a chip site on the wafer.

\* \* \* \* \*